(12) United States Patent
Redman

(10) Patent No.: US 6,352,274 B1
(45) Date of Patent: Mar. 5, 2002

(54) OCCUPANT PROPELLED LAND VEHICLE

(76) Inventor: Brian Lee Redman, 11501 King Rd., Richmond (CA), V7A 3B5

( * ) Notice: Subject to any disclaimer, the term of this patent is extended or adjusted under 35 U.S.C. 154(b) by 0 days.

(21) Appl. No.: 09/761,066

(22) Filed: Jan. 17, 2001

(51) Int. Cl.[7] .............................. B62K 5/08; B62M 1/16
(52) U.S. Cl. ...................... 280/248; 280/266; 280/267; 280/282
(58) Field of Search ................................ 280/226.1, 234, 280/244, 247, 235, 248, 256, 266–267, 288.1, 250, 249, 282, 220

(56) References Cited

U.S. PATENT DOCUMENTS

| | | | | |
|---|---|---|---|---|
| 4,432,561 A | * | 2/1984 | Feikema et al. | 280/266 |
| 4,572,535 A | * | 2/1986 | Stewart et al. | 280/282 |
| 4,705,284 A | * | 11/1987 | Stout | 280/250.1 |
| 5,209,506 A | * | 5/1993 | Klopfenstein | 280/240 |
| 5,354,084 A | * | 10/1994 | Lofgren et al. | 280/266 |
| 5,853,184 A | * | 12/1998 | Lofgren et al. | 280/266 |
| 6,070,894 A | * | 6/2000 | Augspurger | 280/249 |

* cited by examiner

Primary Examiner—Anne Marie Boehler

(57) ABSTRACT

A three-wheeled occupant propelled vehicle is described. A seat is centrally suspended on a longitudinal axis, so that by leaning from side to side, the occupant may impart a steering motion by way of linkages between the seat and the steered front wheels. Said longitudinal axis is disposed vertically above the center of mass of the body of the occupant, so that, by the force of gravity, the occupant tends to stay in a vertical position unless a leaning motion is imparted, and straight line directional control is thus maintained. Motive power is provided by hand-actuated reciprocating levers coupled by a linking means to a driven rear wheel. Power is applied in both the fore and aft strokes of said levers. One embodiment of the present invention includes a variable ratio drive.

6 Claims, 5 Drawing Sheets

OCCUPANT PROPELLED LAND VEHICLE

CROSS-REFERENCE TO RELATED APPLICATIONS

Not Applicable

STATEMENT REGARDING FEDERALLY SPONSORED RESEARCH DEVELOPMENT

Not Applicable

REFERENCE TO A MICROFICHE APPENDIX

Not Applicable

BACKGROUND OF THE INVENTION

References Cited:

U.S. PATENT DOCUMENTS

| Number | Date | Name | Class |
|---|---|---|---|
| 85,501 | 12/1868 | Wood | 280/235 |
| 252,455 | 01/1882 | Giles | 280/235 |
| 329,755 | 11/1885 | McIntosh | 280/235 |
| 838,228 | 12/1906 | Williams | 280/7.15 |
| 1,105,216 | 07/1914 | Smith | 280/240 |
| 2,643,898 | 06/1953 | Everest et al. | 280/240 |
| 3,958,814 | 05/1976 | Smith | 280/269 |
| 4,132,435 | 01/1979 | Wilson | 280/772 |
| 4,279,429 | 07/1981 | Hopkins et al. | 280/267 |
| 4,432,561 | 02/1984 | Feikuma et al. | 280/281 LP |
| 4,460,190 | 07/1984 | Spiess | 280/247 |
| 4,526,392 | 07/1985 | Berkstresser | 280/281 LP |
| 4,632,414 | 12/1986 | Ellefson | 280/246 |
| 4,705,284 | 11/1987 | Stout | 280/242 |
| 4,789,173 | 12/1988 | Lofgren | 280/281 LP |
| 4,925,200 | 05/1990 | Jones | 280/233 |
| 5,028,064 | 07/1996 | Johnson | 280/250.1 |
| 5,209,506 | 05/1993 | Klopfenstein | 280/240 |
| 5,322,312 | 06/1994 | Cammack | 280/244 |
| 5,354,084 | 10/1994 | Lofgren et al. | 280/250 |
| 5,536,029 | 07/1996 | Gramckow | 280/263 |

The field of this invention is that of occupant propelled vehicles (class 280/200), propelled by hand (class 280/242.1), by means of a lever connected to a crank (class 280/247), wherein the vehicle is constructed to be steered by the seat of the vehicle under influence of the body of the occupant (class 280/235). The vehicle disclosed herein is intended for, but not limited to, the outdoor leisure use of persons with restricted or no capacity of the lower limbs.

Beyond the common wheelchair, there has opened up in recent years a category of human-powered vehicles for handicapped riders, developed around wheelchair sports applications. Two styles have emerged: one is a variation on the conventional wheelchair, in which the rider pushes with the hands directly onto rings attached to the main wheels; and the other, typically referred to as a 'handcycle', derives from the bicycle, but with additional wheels, and the driving pedals moved to within reach of the hands. There are a number of disadvantages to both of these styles which render them unsuitable for either daily outdoor transportation, or for casual, recreational use, in the way that an able-bodied person might use an ordinary bicycle. Neither style is particularly well suited to the human form in terms of the ergonomic factors of efficient muscle use, strain avoidance, and overall rider comfort. By and large, they are adaptations of designs which have been optimized over time, for other purposes, or other muscle groups.

Most wheelchair-style designs force the rider to sit in a doubled-over position, head facing towards the ground, thereby restricting both breathing, vision and rider comfort. This style offers none of the mechanical advantages that bicycle-type gearing might deliver, but requires the rider to grip the wheel ring, push through an arc using an awkward extension of the wrist muscles, release the grip, retract the arm and reposition the hand for the next thrust; this sequence must be repeated constantly, and in rapid succession in order to gain forward momentum.

The typical handcycle positions the pedals, sprocket and chain uncomfortably close to the rider's face, often directly in the line of sight. Such a layout also requires the rider to operate the vehicle with his arms in a constantly elevated position, with the consequent strain and fatigue that results from this attitude. The handcycle style presents a safety concern in the location of the handbrake levers: because the hand pedals require full 360 degree freedom of rotation around their axes, the brake levers typically are not attached to these same hand pedals, but are located on a frame member nearby, requiring the rider to release his grip on the thrust member and reposition it elsewhere for braking, which is far from optimum in emergency situations.

Both styles tend to be quite low-slung in order to achieve a degree of stability while cornering quickly. But this low seating position makes mounting and dismounting difficult, and makes these vehicles quite unsafe for street use, as the rider's head is positioned lower than the fender height of the average automobile. As well as seriously restricting the rider's field of vision, in traffic situations both rider and vehicle can fall below the line of sight of drivers nearby. Unable to either see or be seen, riders of such vehicles pose a considerable risk to their own wellbeing.

These factors, as well as the high cost of most commercially available sports wheelchairs and handcycles, are seen as impediments to their more widespread adoption and enjoyment by the handicapped community. The present invention attempts to solve the foregoing problems by configuring a design which is based on the premise that a maximum amount of sustained power can be extracted from the rider's arms and upper torso working in unison, in a rowing action that powers on the forward as well as the backward stroke, wherein the seat is arranged in relation to the rowing handles so as to provide firm support against which to both push and pull, and wherein the rider is positioned in a semi-reclined and relaxed attitude, facing forward and suitably elevated, with the driving arms falling in a natural, comfortable and neutral position with regards to muscle extension. Many patents have been issued for designs, some quite extraordinary, which attempt to harness the rowing energy of the human body for the propulsion of a land vehicle. The common shortcoming of all such previously disclosed devices, which is resolved by the present invention, is the absence of a positive, safe, and mechanically simple method of steering the vehicle, which would allow the handicapped rider to lean into turns in an effortless and intuitive way.

A review of prior claims registered with the U.S. Patent Office revealed no fewer than 74 patents relating to human-powered devices incorporating a rowing or similarly reciprocal motion by which to impart motive power, of which the earliest appears to be U.S. Pat. No. 85,501 (Wood) in 1868. Nine patents were found in which an occupant propelled vehicle is steered by pivoting the seat about a generally vertical axis. A further 18 patents were identified which pertain to the steering of human-powered vehicles in which a leaning motion is either directly applied, or is the result of some other motion applied to initiate steering; this group is exclusive of the conventional bicycle inventions in which a leaning steering action is necessarily implied. (The full list of these prior patents is not cited here, but is attached for reference at the end of this submission as Appendix A). Many of these designs, as in the Wood patent, rely on the operator's feet to perform some function, such as braking, steering, or in some cases, to assist in forward propulsion, while some patents apply to two-wheeled vehicles, which require use of the lower limbs for balance and stability.

U.S. Pat. No. 2,643,898 (Everest et al.) discloses the first instance of a wheelchair, in the familiar style most commonly in use today, propelled using a reciprocating drive; steering is achieved by independently powering wheels disposed on either side of the chair. A great many variants of this latter design have been disclosed, the most recent of which would appear to be U.S. Pat. No. 5,322,312 (Cammack), and most, if not all, of which steer in the same manner as the Everest instance.

The earliest apparent application of a reciprocal, hand-powered driving motion to a chair, which may be operated by a person without the use of his lower limbs, appears in U.S. Pat. No. 838,228 (Williams). Steering in the Williams instance is by way of a lever handle. U.S. Pat. No. 1,105,216 (Smith) describes the first vehicle which could be said to impart the spirit, if not the embodiment of the present invention, but employs two levers operating in opposition to one another, and steers by way of one of the levers which is linked to the front wheel.

U.S. Pat. No. 4,925,200 (Jones), and U.S. Pat. No. 5,209,506 (Klopfenstein) disclose rowing powered cycles utilizing a single centrally located lever to provide propulsion to the driven wheel, and a rotatable handlebar attached to this lever to provide steering. U.S. Pat. No. 4,460,190 (Spiess), U.S. Pat. No. 4,705,284 (Stout), U.S. Pat. No. 5,536,029 (Gramckow), disclose lever powered cycles wherein the steering is provided by a lateral motion of one or more of the lever handles. Each of the foregoing five mentioned patents requires complex, non-intuitive arm and wrist motions for steering, excessive wrist and forearm strength, or both.

U.S. Pat. No. 85,501 (Wood) is also the earliest claim which was found pertaining to the steering of a vehicle having at least three wheels, either by leaning the body of the occupant or the vehicle frame, or by inducing this leaning by the action of a steering wheel or other means. In this patent, as in subsequent and similar U.S. Pat. No. 252,455 (Giles), U.S. Pat. No. 3,958,814 (Smith), U.S. Pat. No. 4,132,435 (Wilson), U.S. Pat. No. 4,279,429 (Hopkins et al.), U.S. Pat. No. 4,432,561 (Feikema et al.), U.S. Pat. No. 4,469,344 (Coil), U.S. Pat. No. 4,740,004 (McMullen), U.S. Pat. No. 4,526,392 (Berkstresser), and U.S. Pat. No. 4,789,173 (Lofgren et al.), motive power is supplied by the riders legs, or some combination of arms and legs.

U.S. Pat. No. 329,755 (McIntosh) discloses a hand-pedaled tricycle wherein steering is achieved at the single front wheel, through a long and complex mechanism, driven by a lateral sliding of the rider's seat back.

U.S. Pat. No. 5,354,084 (Lofgren et al) discloses a hand-powered vehicle, based on the inventor's earlier disclosure, cited above, but employing in this instance a bicycle-style pedal crank located within reach of the rider's hands. Both instances employ an articulated frame, hinged in the middle, which allows the rider to steer the vehicle by shifting is weight from side to side.

None of the foregoing patents employs a steering mechanism as disclosed in the present invention. One U.S. Pat. No. 5,028,064 (Johnson), does disclose a three-wheeled racing wheelchair which is steered by the movement of a laterally pivotable seat, similar to that disclosed in the present invention. The rider can lean into a corner, thereby tilting the seat, and thus affect steering. The preferred embodiment of the present invention differs from, and improves upon said Johnson invention in three significant ways:

1) the Johnson patent discloses in claim 1 a "seat including a lowermost portion positioned below the axes of said large wheels" and a "knee support means above the axes of the large wheels", which arrangement is illustrated in FIG. 1 of the Johnson patent; the Johnson patent further discloses in claims 7 and 20 an optional "biasing means for urging said trailing wheel to a desired central position." A central principle of the present invention is that the seating position of the rider, with the legs generally below the torso, and with the rotational axis of the seat vertically disposed sufficiently above the seat bottom, places the greater proportion of the rider's body mass below the seat axis, keeping the seat centered by the force of gravity, thereby maintaining straight line directional control; the Johnson disclosure neither claims nor illustrates this to be a factor in its design. The present invention also effectively resolves the centering problem without introducing any additional mechanical complexity.

2) In the Johnson invention, steering is affected by a single trailing wheel; the present invention steers two leading wheels, and employs a steering geometry, known as 'Ackerman', whereby the arcuate path described by the outer wheel in a turn is of a greater radius than the arcuate path of the inner wheel, which reduces tire scrub and improves turning efficiency.

3) In the Johnson invention, motive force is provided by the action of rotating the driving wheels directly by hand. The preferred embodiment of the present invention employs a hand-enabled reciprocating drive mechanism attached by a linking means to the rear wheel, permitting in a further embodiment the inclusion of variable gear ratios in said linking means, with the resultant mechanical advantage derived therefrom.

BRIEF SUMMARY OF THE INVENTION

The present invention is a rider-propelled three-wheeled vehicle designed for, but not limited to, persons with disabilities of the lower limbs. The preferred embodiment of the present invention includes a frame, at least one driven rear wheel rotatably attached to the frame, two steerable front wheels rotatably attached to the frame, a seat pivotally mounted on a longitudinal and generally horizontal axis and a linking means connecting the seat to the front wheels. The vehicle can be steered by the inclination of the rider's body side to side, so that rotation of the seat about its mounting axis imparts a displacement of the steering linkages, thus steering the front wheels. The seatmounting axis is vertically disposed sufficiently above the seat bottom, and the position of the rider's body is so maintained, as to place the greater proportion of the mass of the rider below this axis, so that the force of gravity, acting upon the body of the occupant, maintains the occupant in a vertical orientation when no leaning force is applied, thus automatically centering the steering and maintaining straight line control.

In the preferred embodiment, the vehicle is propelled by the fore and aft movement of a pair of reciprocating handlebars, connected through a linkage to the driven wheel, in a simulated rowing motion, powering on the fore as well as the aft stroke. The rotation of these handlebars is constrained to a vertical plane parallel to the longitudinal axis of the vehicle, so that the rider may use these handlebars as a brace against which to control the amount of lean, and therefor control the vehicle direction.

The brake actuating levers are positioned conveniently on the handlebars, in the manner found on conventional bicycles. The mounting positions for the seat, footrest, brake lever, and drive ratio control are all adjustable so as to allow the vehicle to be used by persons of varying size and strength. One embodiment of the present invention includes a means of varying the drive ratio by way of a standard cycle derailleur, internal gearing, or other means.

One object of the present invention is to provide, for persons with disabilities of the lower limbs, a vehicle which is functionally equivalent to a bicycle in terms of utility, rider comfort, safety and enjoyment. A further object is to provide a vehicle which is specifically adapted to, and designed for, the limited muscle groups and movements available to persons with lower limb disabilities, and which is not merely an adaptation of a conventional wheelchair, or of designs optimized for persons with the full use of their legs. A further object is to describe a vehicle which represents the simplest possible design which can meet such ends, utilizing as much conventional and readily available hardware as practical in order to achieve the lowest possible cost, and thereby make the vehicle available to the widest possible market.

DETAILED DESCRIPTION OF THE INVENTION

Figure 1:
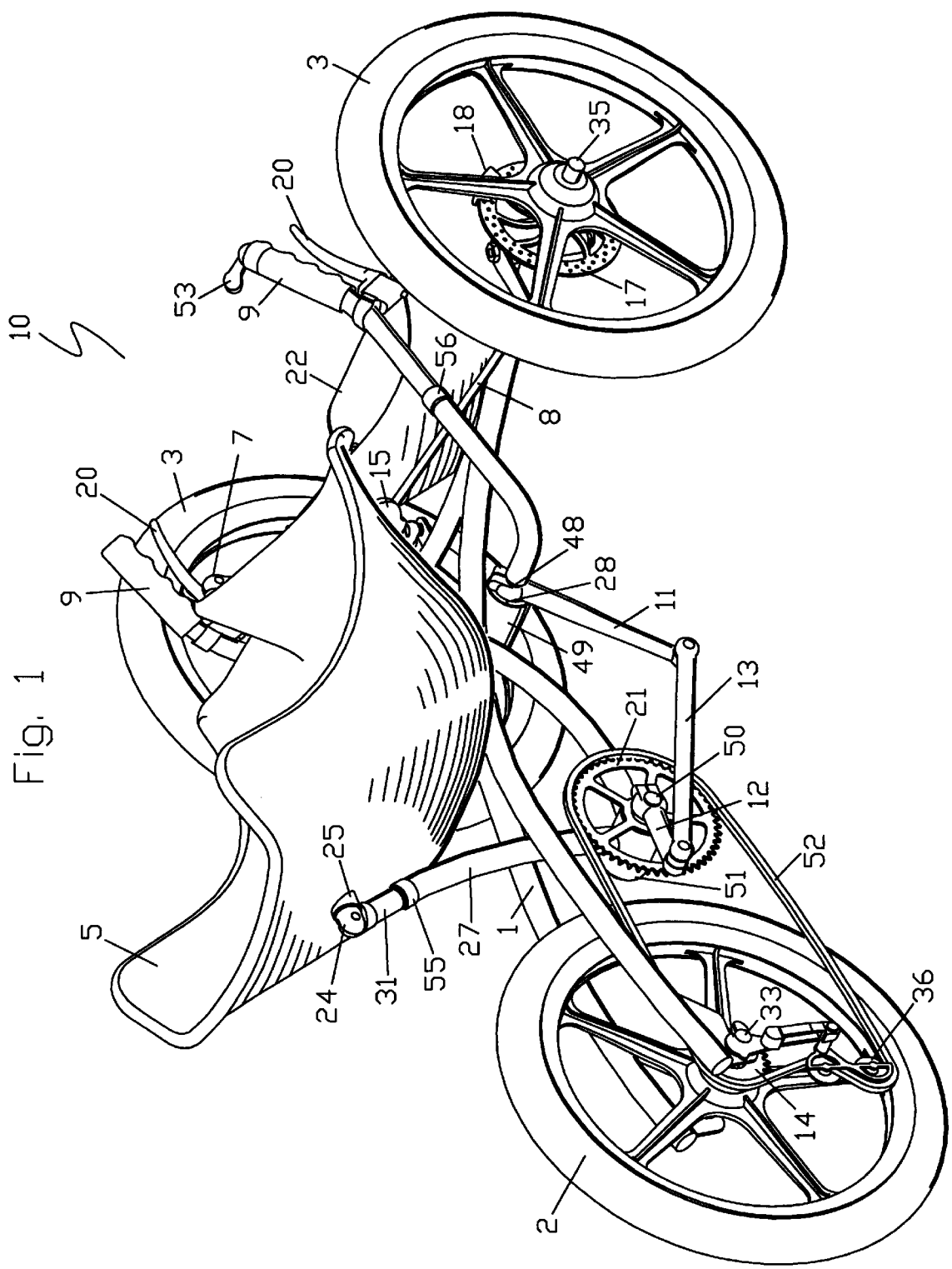
FIG. 1 is a three-quarter view, from the right rear, of a preferred embodiment of the present invention.
Figure 2:
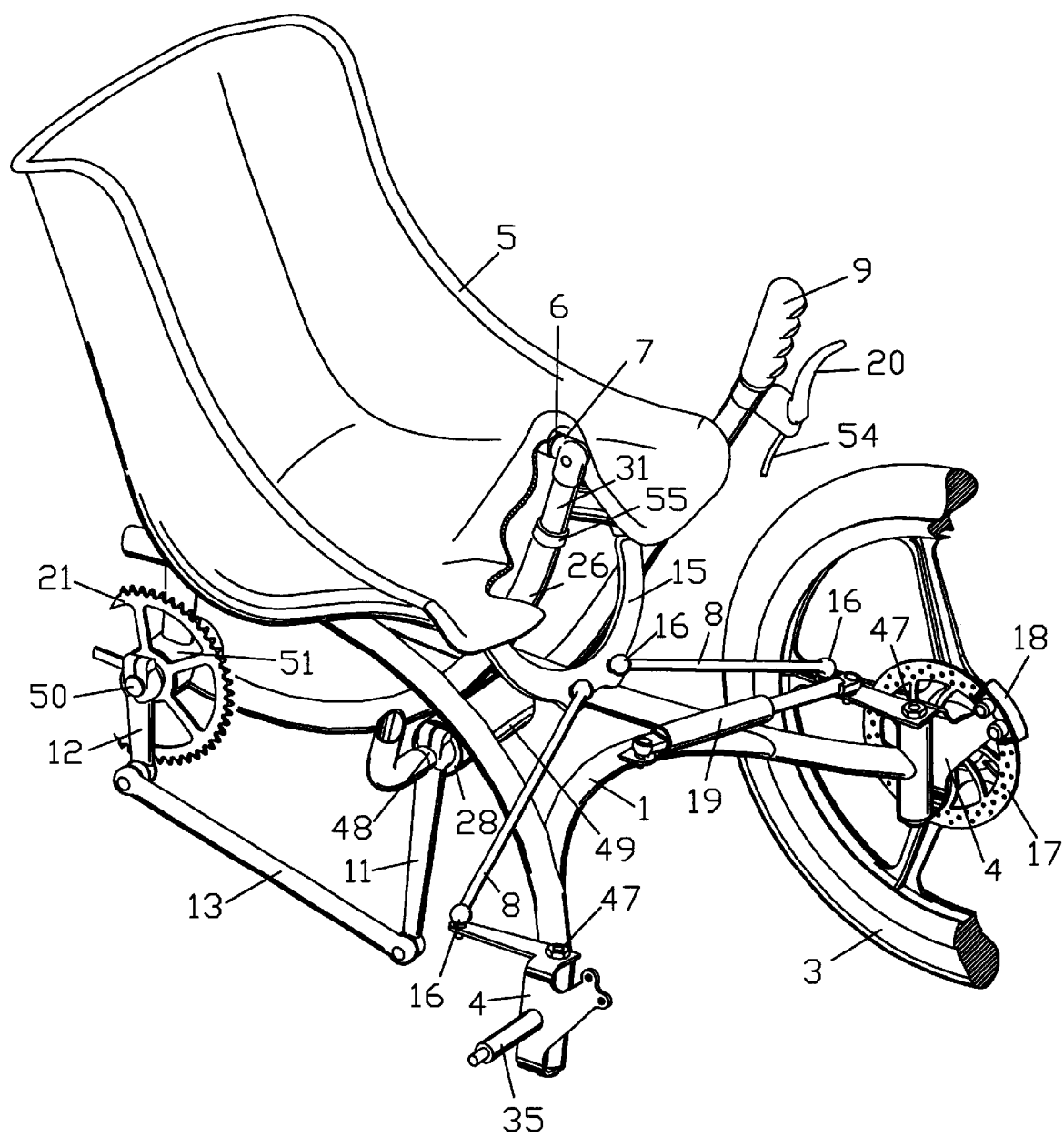
FIG. 2 is a partial three-quarter view from the right front, showing a closeup of the seat and steering linkage.

Referring to FIGS. 1 and 2, an occupant propelled vehicle is shown. The preferred embodiment of vehicle 10 consists of a frame 1, of welded chromalloy or similar strong, lightweight tubing. It will be appreciated that to obtain the goals of the design, the use of many different frame styles and materials is possible, including stamped and formed frame members, or molded composites such as kevlar or carbon fiber. Welded tubing is preferred in this instance for its simplicity of construction and widespread availability. In this embodiment, a single rear wheel 2 is rotatably mounted to an axle 33 which is fastened to the rear of frame 1. Two steerable front wheels 3 are rotatably mounted to the left and right front axles, 34 and 35, which themselves are fixedly attached to the left and right kingpins 4 respectively; the kingpins 4 are hingedly attached to the front of frame 1.

Welded to, and forming part of frame 1 are a front seat support post 26 and a rear seat support post 27. Adjustably mounted to the top of the rear seat post 27 is the rear seat bearing 24; adjustably mounted to the front seat post 26 is front seat bearing 7. Attached to seat 5 are the rear seat journal 25 and the front seat journal 6; said journals 6 and 25 are coaxially supported by said bearings 7 and 24 for the purposes of supporting seat 5, and allowing the tilting of seat 5 around the seat rotation axis 29 shown in FIG. 3. Attached below, and forming part of seat 5 is a mounting plane 15. Hingedly attached to the mounting plane 15 are a left and a right tie-rod 8; ball-and-socket tie-rod ends 16 allow the free movement of the tie-rods 8 without constraining them to the plane of rotation of the mounting plane 15, as described by the arc of rotation of the seat 5 and mounting plane 15 assembly around the seat rotation axis 29. The tie-rods 8 are hingedly attached at the opposite ends to left and right kingpins 4 by way of ball-and-socket tie-rod ends 16. Thus it can be understood that a tilting movement of seat 5 around seat rotation axis 29 imparts a lateral displacement to either tie-rod 8, causing a rotating motion of the kingpins 4 around the kingpin steering axes 47. This action is illustrated in FIGS. 4A & 4B.

Figure 3:
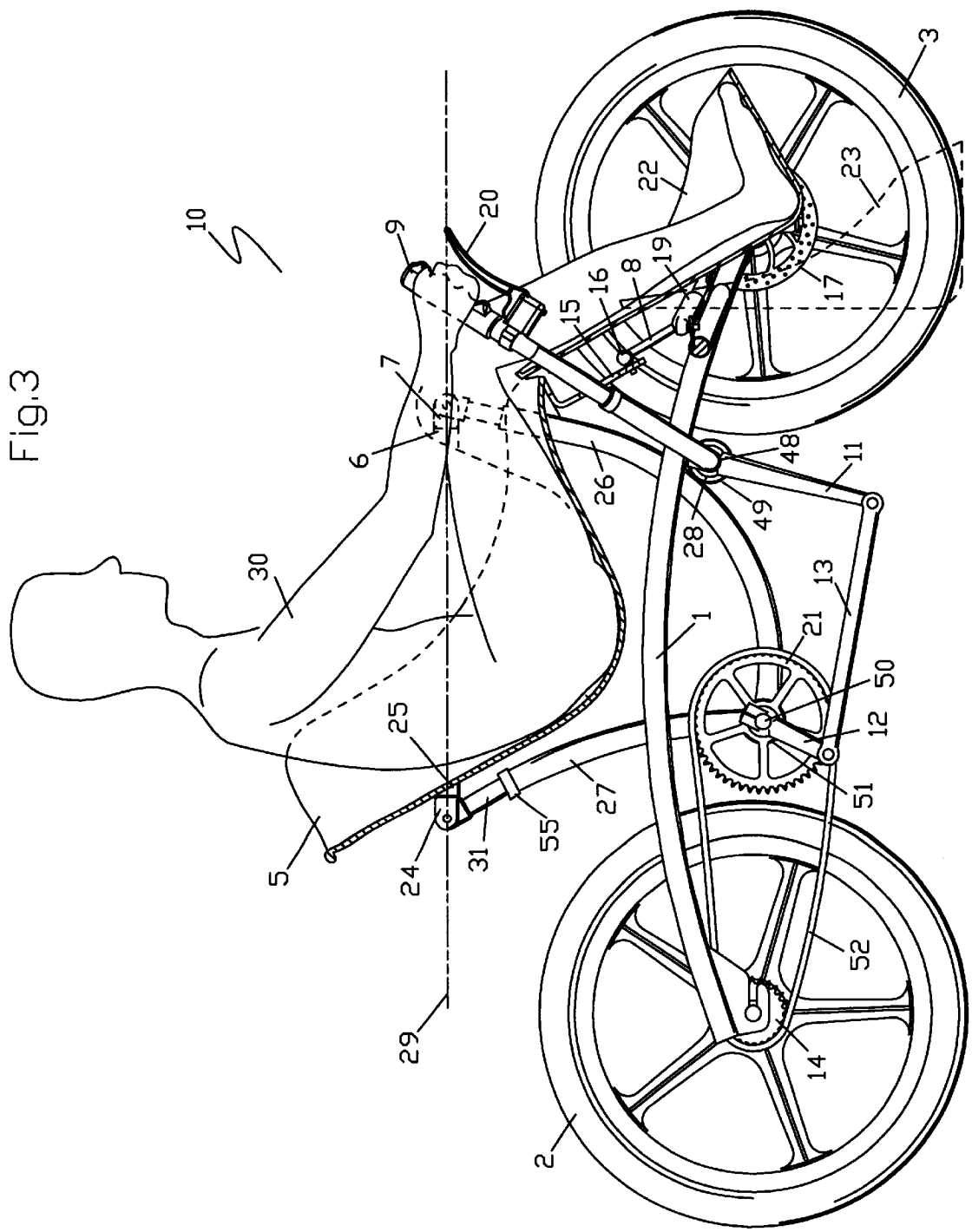
FIG. 3 is a side view of a preferred embodiment of the present invention, showing the relationship between the center of mass of the occupant's body, and the longitudinal horizontal axis around which the seat is pivotally suspended.

Referring to FIG. 3, occupant 30, seated in seat 5, will have at least 50% of his or her body weight below the seat rotation axis 29. The mounting positions of seat journals 6 and 25 relative to seat 5 are vertically adjustable so as to compensate for riders with different body proportions, or even missing limbs. Similarly, the height and angle of inclination of the seat rotation axis 29 is adjustable for riders of different size, by the raising and lowering of the seat height adjustment columns 31, visible in FIGS. 1 and 4A, which are restrained at the desired positions by compression clamps 55, in the manner typical of a conventional bicycle seat post. Similarly, the angle of inclination of the seat support posts 26 & 27 allow for larger or smaller versions of seat 5 to be installed, to maintain a snug fit to the body of the occupant 30.The preferred arrangement allows gravity acting on the occupant 30 body mass to create a stabilizing pendulum effect, thus keeping the seat 5 in a vertical orientation until occupant 30 desires to turn the vehicle 10. At such a point, the occupant 30 tilts the seat 5, by grasping the handlebars 9, and, using them as a brace against which to push or pull from side to side, leans his or her body in the direction in which it is desired to turn; thus, steering is affected.

Figure 4A:
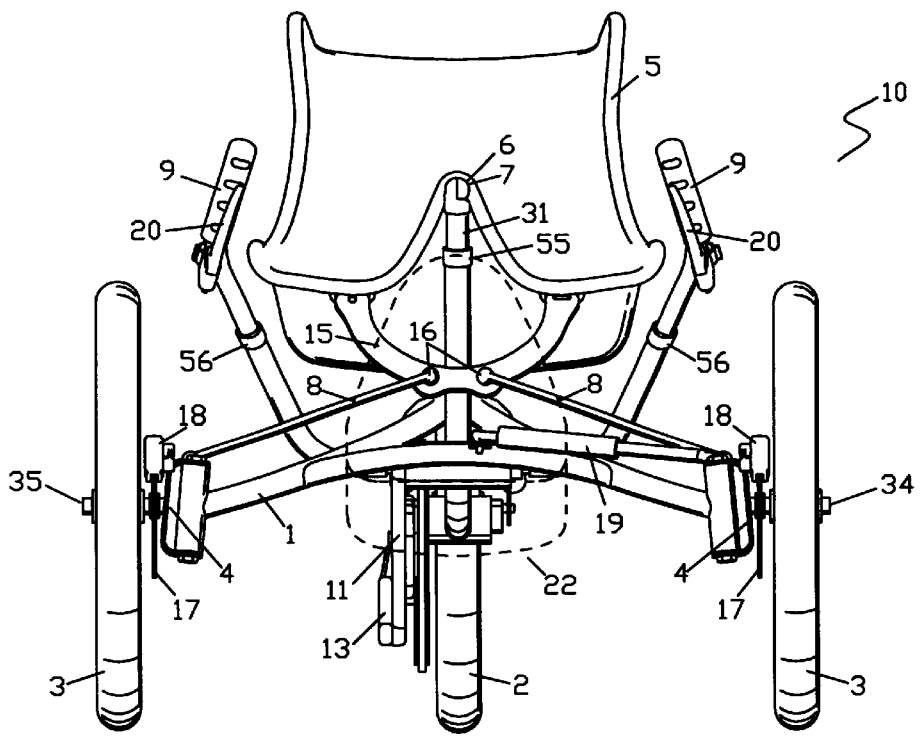
FIG. 4A is a front view of the preferred embodiment of the present invention, with the footrest shown in ghosted outline to reveal the steering linkage.
Figure 4B:
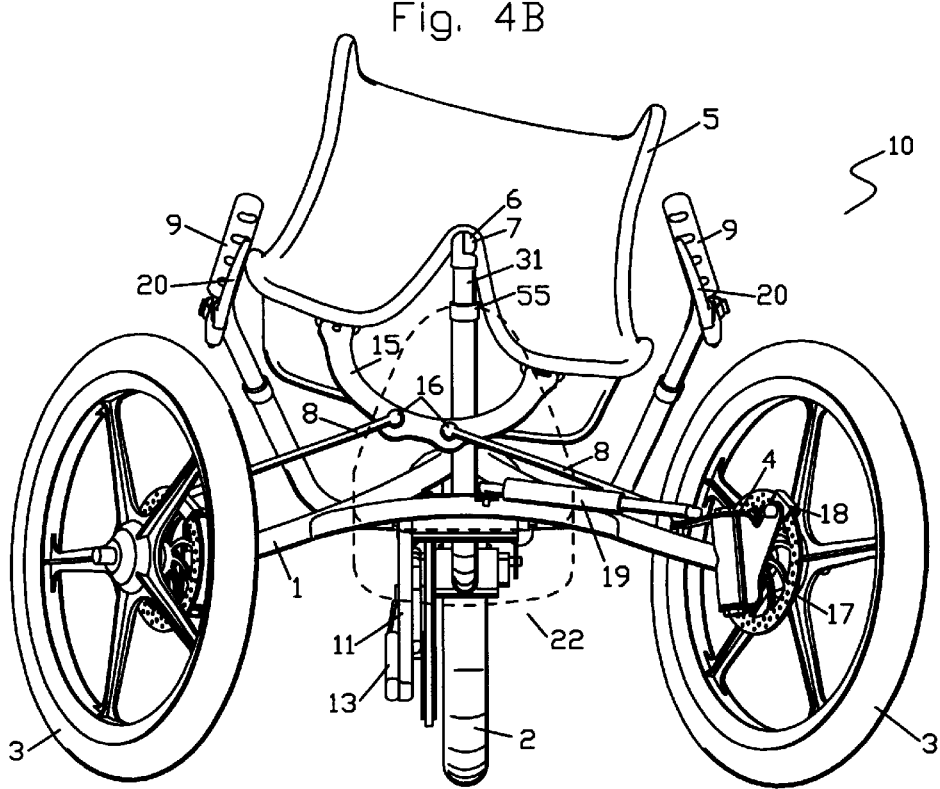
FIG. 4B is a front view as in FIG. 4A, showing the seat tilted, with the resultant displacement of the tierods, and turning of the front wheels.
Figure 5:
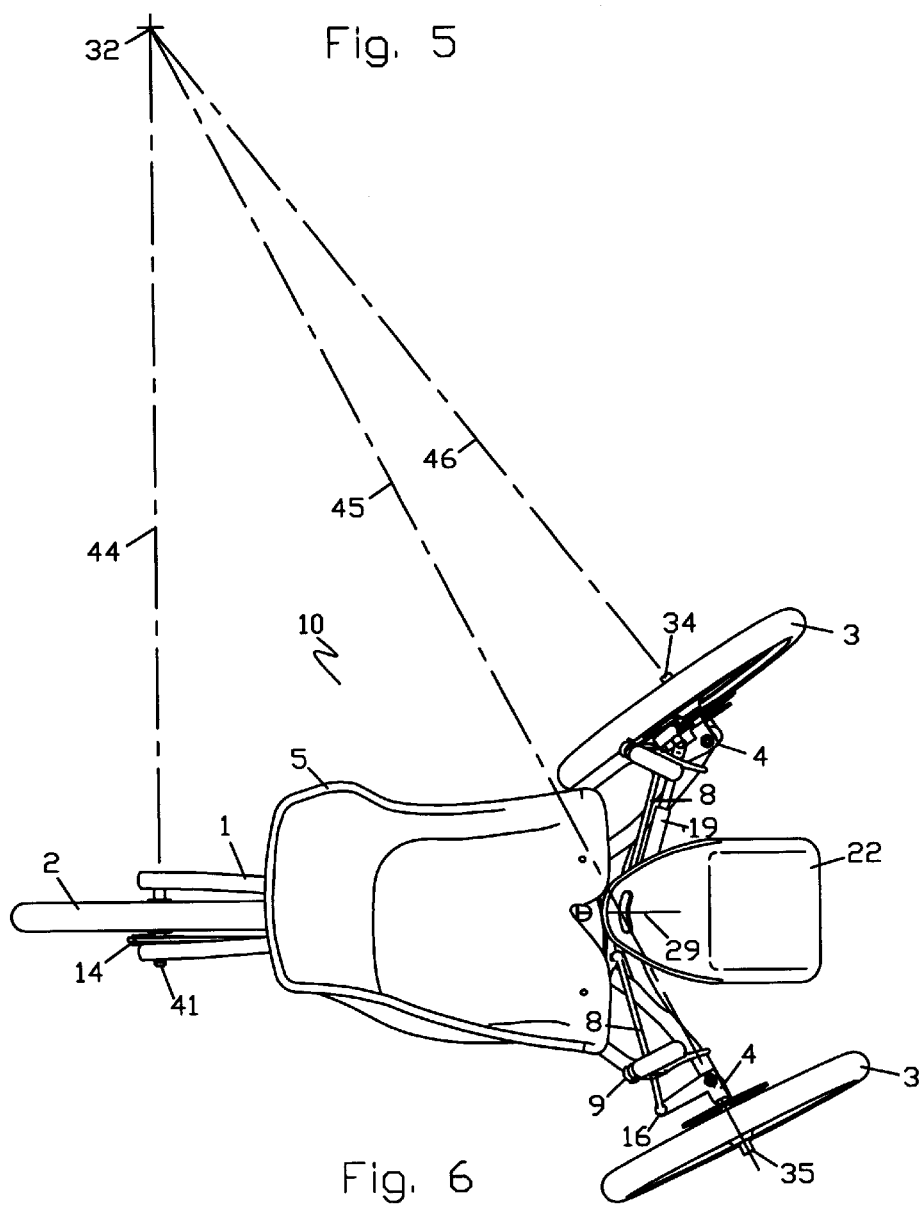
FIG. 5 is a top view of the preferred embodiment of the present invention describing the steering arc.

An analysis of FIGS. 4A, 4B & 5 illustrates that the relationship of the seat 5 and the attached tie-rods 8 to the kingpins 4 is such that when the seat is tilted, an asymmetrical lateral displacement is applied to either tierod 8, causing the wheels 3 to turn at different angles. It can be seen in FIG. 5 that lines 44, and 45 projected through the front axle centers 34 & 35 of the front wheels 3 meet at a point 32, where they intersect a line 46 drawn through the center of the rear axle 41. The purpose of this arrangement is to ensure that all wheels turn about a common point, which reduces tire scrub and hence the energy required to execute a turn. This is a steering geometry known to those familiar with the art as 'Ackerman', after its originator of nearly 200 years ago, and is in widespread use in the automotive world today. The present invention is the only known instance of an occupant powered vehicle which achieves true Ackerman steering through the device of tilting the seat by leaning.

Referring again to FIG. 3, it can be seen that motive power for the vehicle 10 is provided by the occupant 30 grasping handlebar 9 and alternately pulling and pushing. The handlebar 9 is an approximate U-shape construction, with a left-hand and a right-hand arm each rigidly attached to a central crank journal 48, which is rotatably mounted in a set of bearings 28 which reside in a lateral crank support tube 49, which in turn is welded to the frame 1. One end of the driving crank 11 is fixedly attached to the crank journal 48, and rotatably connected at its other end to the connecting rod 13, which itself is rotatably connected at its other end to the sprocket crank 12. Reciprocating movement of the handlebar 9 is thus transmitted via the driving crank 11 through the connecting rod 13 and converted to a rotating movement by the sprocket crank 12, which is fixedly attached to sprocket shaft 50. Thereafter, the remaining drive train is fashioned, for economy, using conventional bicycle components: sprocket shaft 50 is rotatably mounted in the sprocket shaft support tube 51, which is welded to frame 1; main sprocket 21 is fixedly attached to sprocket shaft 50 and rotates in unison with it, driving a chain 52, which in turn drives the rear wheel sprocket 14, thereby turning the rear wheel 2 and providing forward thrust. FIG. 3 indicates a single speed version while FIG. 1 illustrates a multi-speed configuration incorporating a standard bicycle derailleur 36. FIG. 3 could also be said to indicate a multi-speed rear hub where the gearing is internal. It can be appreciated that with a configuration as in FIG. 3, alternate drive components such as a belt and pulleys could be substituted for the chain and sprockets shown, to eliminate the need for an oily chain.

Figure 6:
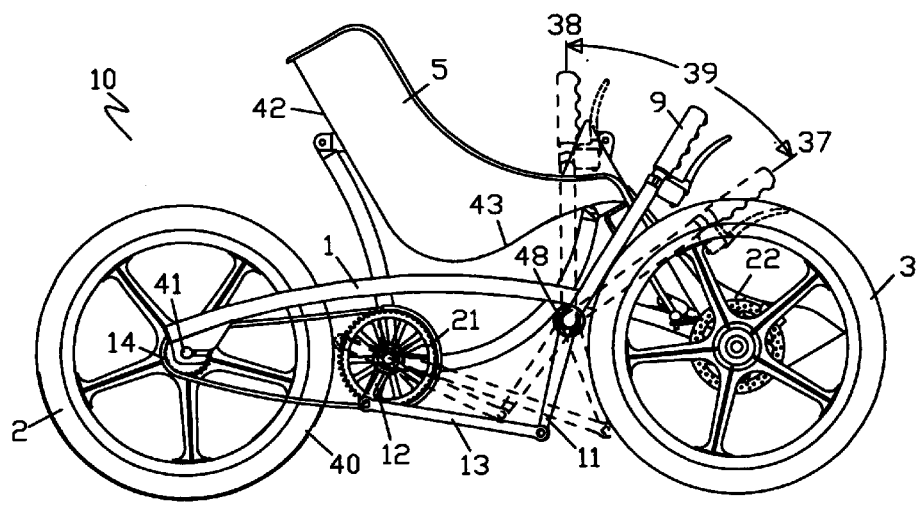
FIG. 6 is a side view showing the reciprocating drive mechanism, with the full forward and full backward positions of the handlebars shown in ghosted outline.

FIG. 6 illustrates the forward limit 37 and backward limit 38 of the power stroke 39. It can be seen that the relationship of the seat 5 to the handlebar pivot axis, coaxial with crank journal 48, is such that when the handlebar 9 is at the forward stroke limit 37, and the backward power stroke is initiated, the seat bottom 42 is ideally situated so as to provide support against which the user can exert maximum pulling force on the handlebar 9. As the backward stroke progresses from a generally upward motion to a more generally rearward motion, the raised center section at the front of seat 5, similar in shape to a saddle horn, prevents the rider from sliding forward in response to this pulling force. Similarly, when the handlebar 9 is at the backward stroke limit 38, the seat back 42 is at a near optimum angle to provide a firm brace against which the occupant can push in order to initiate the forward stroke. As the stroke progresses forwards and downwards, the user's weight is sufficient to provide the counteraction to the movement of the arms and upper torso to complete the stroke. This arrangement is a nearly ideal means of extracting the maximum force possible from the arms and upper torso alone, and, in combination with the intuitive steering design and optional multi-speed derailleur, provides an arm-powered transport mechanism of unparalleled efficiency.

FIG. 3 shows a pneumatic shock damper 19 connected between the frame 1 and one kingpin 4; the purpose of the damper is to control the oscillation that can occur when the front wheels 3 encounter irregularities in the road surface, especially at speed, sometimes characterized as 'speed wobble'. FIG. 3 also shows a closeup view of a brake disc 17, brake caliper 18, and brake actuating lever 20. The brake line or cable 54 connecting the brake lever 20 to the brake caliper 18 is only partially indicated at the lever 20 end. Brakes may be mounted to all wheels or the front wheels 3 only.

The brake actuating levers 20 and the gear ratio adjustment lever 53, if utilized, are mounted to the handlebars 9. To adapt for riders of different size, the length of the handlebars 9 may be adjustable by a telescoping means, and fixed in position with the handlebar adjustment clamps 56.

Mounting and dismounting the vehicle 10 is made easier by having the footrest 22 hingedly mounted on slide rails (not shown) so that it can be lowered into a vertical position 23, as indicated in FIG. 3. With the footrest so lowered, a conventional wheel chair can be brought close to the occupant 30, so that by grasping the handlebars 9 in the full forward position 37, shown in FIG. 6, and actuating the brake levers 20 to prevent the vehicle 10 from rolling, one can pull oneself forward out of the seat 5 into a standing position, supporting oneself on the handlebars 9, from where one can manouevre into the wheelchair or onto some other waiting support.

What is claimed:

1. An occupant propellable land vehicle comprising:

a frame capable of supporting said occupant;

at least one driven wheel disposed towards the rear of, and rotatably mounted to said frame;

two laterally spaced front wheels disposed on opposite sides of, and towards the front of said frame;

a left spindle and a right spindle hingedly mounted to said frame, for supporting said front wheels and allowing rotation of said front wheels relative to said frame about a generally horizontal axis, and to allow a steering motion about generally vertical steering axes;

a seat assembly pivotally attached by a bearing means to said frame, supported fore and aft by journals attached to, and forming part of said seat assembly;

said seat assembly having a bottom surface;

said journals being aligned on a generally horizontal and longitudinal axis relative to said frame, said journal axis being sufficiently disposed above said seat assembly bottom surface so that the majority of said seat assembly is positioned below said journal axis;

at least one linkage pivotally attached at one end thereof to said seat assembly, said linkage pivotally attached at the opposite end thereof to at least one of said spindles, in such a manner as to operatively connect said seat assembly to said front wheels, whereby the inclination of said seat assembly to the left and right initiates simultaneous turning of both said front wheels to the left and right respectively.

2. A vehicle as described in claim 1 wherein a reciprocating lever is graspable by said occupant;

said lever being operatively connected to said driven wheel by a linking means, so that an impulse applied to said reciprocating lever by said occupant will induce forward motion in said vehicle;

said reciprocating lever being restrained to rotate around a generally horizontal axis, normal to a vertical plane, aligned with the longitudinal axis of said frame.

3. A vehicle as described in claim 2 having at least one brake actuating means attached to said reciprocating lever means, and a braking device attached to at least one of said wheels, for the purpose of retarding the motion of said vehicle.

4. A vehicle as described in claim 3 wherein a shock absorbing means is incorporated into the steering assembly so as to prevent unwanted arcuate oscillations of said front wheels about said steering axes.

5. A vehicle as described in claim 4 wherein allowances for variations in size, weight, and strength of said occupant are provided by:

said reciprocating lever means being adjustable in length so as to vary the distance from the lever end to the lever fulcrum;

said brake actuating means being positionally adjustable on said reciprocating lever means, so as to effectively vary the hand position and hence the effective length of said reciprocating lever means;

said fore seat journal and said aft seat journal being independently adjustable in the vertical plane relative to said frame, so as to vary the height and inclination of said seat journal axis and thus the height and inclination of the seat back and seat bottom, relative to the surface on which said vehicle is supported.

6. A vehicle as described in claim 5 wherein a variable drive ratio is provided for in said linking means to said driven wheel;

said reciprocating lever means having attached thereto an adjustment means for controlling said variable drive ratio.

* * * * *